United States Patent
Henin et al.

(10) Patent No.: US 10,670,756 B2
(45) Date of Patent: Jun. 2, 2020

(54) METHODS AND SYSTEMS OF JOINED INVERSION DETERMINATION OF SURFACE-CONSISTENT AMPLITUDE CORRECTIONS

(71) Applicant: CGG SERVICES SA, Massy (FR)

(72) Inventors: Guillaume Henin, Massy (FR); Katia Garceran, Saint Cheron (FR); David Le Meur, Gif-sur-Yvette (FR); Frédérique Bertin, Palaiseau (FR); Anne Rollet, Paris (FR)

(73) Assignee: CGG SERVICES SAS, Massy (FR)

( * ) Notice: Subject to any disclaimer, the term of this patent is extended or adjusted under 35 U.S.C. 154(b) by 134 days.

(21) Appl. No.: 15/106,587

(22) PCT Filed: Dec. 19, 2014

(86) PCT No.: PCT/IB2014/003131
§ 371 (c)(1),
(2) Date: Jun. 20, 2016

(87) PCT Pub. No.: WO2015/097556
PCT Pub. Date: Jul. 2, 2015

(65) Prior Publication Data
US 2016/0363680 A1      Dec. 15, 2016

Related U.S. Application Data

(60) Provisional application No. 61/920,092, filed on Dec. 23, 2013.

(51) Int. Cl.
*G01V 1/36* (2006.01)
*G01V 1/18* (2006.01)
*G01V 1/28* (2006.01)

(52) U.S. Cl.
CPC .............. *G01V 1/362* (2013.01); *G01V 1/181* (2013.01); *G01V 1/282* (2013.01)

(58) Field of Classification Search
CPC ........................................................ G01V 1/362
See application file for complete search history.

(56) References Cited

U.S. PATENT DOCUMENTS

| 2008/0265895 A1* | 10/2008 | Strack | G01V 3/083 324/347 |
| 2009/0006053 A1* | 1/2009 | Carazzone | G01V 3/083 703/5 |
| 2013/0176820 A1 | 7/2013 | Le Meur et al. | |

OTHER PUBLICATIONS

Li et al., "Seismic reservoir characterization: how can multicomponent data help?" J. Geophysics Eng. (2011).*

(Continued)

*Primary Examiner* — Hyun D Park
(74) *Attorney, Agent, or Firm* — Patent Portfolio Builders PLLC (57) ABSTRACT

Methods and systems performing joint inversion determination of surface-consistent amplitude corrections are provided. A method includes receiving a seismic data set including P-P data and P-S data, and preparing the P-P data and the P-S data for a joined inversion to produce prepared P-P data and prepared P-S data. The method further includes performing a joined inversion on both the prepared P-P data and the prepared P-S data to calculate final surface consistent scalars. The method also includes outputting a corrected P-P trace determined from the P-P data and a P-P gain obtained from the final surface consistent scalars, and a corrected P-S trace determined from the P-S data and a P-S gain obtained from the final surface consistent scalars.

18 Claims, 3 Drawing Sheets

(56) References Cited

OTHER PUBLICATIONS

P. Newman, et al.; "Patterns—with a pinch of salt"; Geophysical Prospecting, vol. 21; pp. 197-219; Jun. 1973.
M. T. Taner, et al.; "Surface consistent corrections" Geophysics, vol. 46, No. 1; pp. 17-22; Jan. 1981.
K. Garceran, et al.; "Simultaneous Joint Inversion for Surface-consistent Amplitude and Deconvolution"; 74th EAGE Conference & Exhibition, Expanded Abstract; Jun. 4-7, 2012; pp. 1-5; Copenhagen, Denmark.
International Search Report in related International Application No. PCT/IB2014/003131, dated Jul. 8, 2015.
Written Opinion of the International Searching Authority in related International Application No. PCT/IB2014/003131, dated Jul. 8, 2015.
Y. Dang et al., "Delineating Oil-sand Reservoirs with High-resolution PP/PS Processing and Joint Inversion in the Junggar Basin, Northwest China", The Leading Edge, Special Section: Multicomponent Seismic, Oct. 2010, pp. 1212-1219.

* cited by examiner

METHODS AND SYSTEMS OF JOINED INVERSION DETERMINATION OF SURFACE-CONSISTENT AMPLITUDE CORRECTIONS

CROSS-REFERENCE TO RELATED APPLICATION

The present application claims the benefit of priority under 35 U.S.C. § 119 from U.S. Provisional Patent Application Ser. No. 61/920,092, filed on Dec. 23, 2013, which is incorporated by reference in its entirety for all purposes.

TECHNICAL FIELD OF THE DISCLOSURE

This disclosure relates generally to seismic analysis, and in particular, to methods and systems of correcting amplitude perturbations due to near surface conditions.

BACKGROUND

Land-based seismic data acquisition and processing techniques are used to generate a profile (image) of a geophysical structure (subsurface) of the underlying strata. This profile does not necessarily provide an accurate location for fluid reservoirs, but it may suggest, to those trained in the field, the presence or absence of fluid reservoirs.

The acquisition of data in land-based seismic methods usually produces different results in source strength and signature based on differences in near-surface conditions. Further data processing and interpretation of seismic data requires correction of these differences in the early stages of processing. Surface consistent amplitude corrections may be used in seismic processing to correct for amplitude perturbations due to the near surface conditions. The performance of sources and receivers arrays is sensitive to the variations in the sources strength and receivers coupling. Conventional approaches to address these variations involve decomposing the root-mean-square (RMS) amplitude of each seismic trace from an array of sources and receivers into a combination of a source term As and a receiver term Ar as $A=\alpha A_s A_r$. Conventional correction for surface-consistent amplitudes of P-P and P-S datasets from multicomponent surveys are performed separately leading to two distinct sets of corrective gains for the P-P and P-S traces.

The data from the P-P and P-S traces have different time scales due to the differences in propagations of these waves. In general, a P-wave is an elastic body wave in which particle motion is in the direction of propagation. By contrast, in general, an S-wave is an elastic body wave in which particles oscillate perpendicular to the direction in which the wave propagates. A gamma ratio may be used to compare the P-P and P-S datasets. The gamma ratios enables to draw a link between P-P and P-S time scales and offers the way to relocate converted events in the same time scale as the P-P events. Several techniques are available to estimate this key value, based on criteria like the optimal correlation between opposite azimuth stacks or derived from transit times. By nature, even after a stretching of the P-S dataset to P-P time, the P-S dataset amplitudes are different from the P-P datasets amplitudes. To jointly use the two datasets for the determination of surface consistent scalars for shots and receivers, the average amplitudes of the two datasets must be equivalent, which may require a global equalization gain. Afterwards, a common value can be used for the mean amplitude term in the surface consistent model.

Conventional systems and methods for surface consistent amplitude corrections perform separate processing on the P-P dataset and the P-S dataset. This requires two processing steps. In addition, the separate solution of the surface consistent amplitude correction of the P-P dataset does not inform the surface consistent amplitude correction of the P-S dataset. Nor does the separate solution of the surface consistent amplitude correction of the P-S dataset inform the surface consistent amplitude correction of the P-P dataset. What is needed therefore are methods and systems for performing a joined inversion of the P-P and P-S datasets for the determination of surface-consistent amplitude corrections.

SUMMARY

In one embodiment, the present disclosure may include a method, which includes receiving a seismic data set including P-P data and P-S data, and preparing the P-P data and the P-S data for a joined inversion to produce prepared P-P data and prepared P-S data. The method may further include performing a joined inversion on both the prepared P-P data and the prepared P-S data to calculate final surface consistent scalars. The method may further include outputting a corrected P-P trace based, at least in part, on the P-P data, and a P-P gain, wherein the P-P gain is based, at least in part, on the final surface consistent scalars and outputting a corrected P-S trace based, at least in part, on the P-S data and a P-S gain, wherein the P-S gain is based, at least in part, on the final surface consistent scalars.

In another embodiment, the present disclosure may include a system for calculating surface consistent amplitude corrections. The system may include at least one processor and a memory including non-transitory computer-readable executable instructions. The executable instructions may cause such processor to receive a seismic data set including P-P data and P-S data. The executable instructions may cause the processor to prepare the P-P data and the P-S data for a joined inversion to produce prepared P-P data and prepared P-S data. The executable instructions may cause the processor to perform a joined inversion on both the prepared P-P data and the prepared P-S data to calculate final surface consistent scalars. The executable instructions may cause the processor to output a corrected P-P trace based, at least in part, on the P-P data, and a P-P gain, wherein the P-P gain is based, at least in part, on the final surface consistent scalars. The executable instructions may cause the processor to output a corrected P-S trace based, at least in part, on the P-S data and a P-S gain, wherein the P-S gain is based, at least in part, on the final surface consistent scalars.

In another embodiment, the present disclosure may include a system for geological surveying that includes a plurality of receivers to receive energy from subsurface and produce signals responsive to the received energy. The system may include at least one processor and a memory including non-transitory computer-readable executable instructions. The executable instructions may cause the processor to receive a seismic data set including P-P data and P-S data. The executable instructions may cause the processor to prepare the P-P data and the P-S data for a joined inversion to produce prepared P-P data and prepared P-S data. The executable instructions may cause the processor to perform a joined inversion on both the prepared P-P data and the prepared P-S data to calculate final surface consistent scalars. The executable instructions may cause the processor to output a corrected P-P trace based, at least in part, on the P-P data, and a P-P gain, wherein the P-P gain is based, at least in part, on the final surface consistent scalars. The executable instructions may cause the processor to output a corrected P-S trace based, at least in part, on the P-S data and a P-S gain, wherein the P-S gain is based, at least in part, on the final surface consistent scalars.

BRIEF DESCRIPTION OF THE DRAWINGS

For a more complete understanding of the present disclosure and its features, reference is now made to the following description, taken in conjunction with the accompanying drawings, in which like reference numbers indicate like features and wherein.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of estimating more reliable surface-consistent attributes using a joined inversion of both P-P and P-S data. The embodiments, however, are not limited to these configurations, and may be extended to other arrangements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to provide a context for the subsequent exemplary embodiments, a description of aspects and terminology is hereby included. The methods and systems described herein generate and receive P-waves and S-waves. A P-wave is the wave studied in conventional seismic data and is an elastic body wave or sound wave in which particles oscillate in the direction the wave propagates. P-waves incident on an interface at other than normal incidence can produce reflected and transmitted S-waves, otherwise known as converted waves.

An S-wave, generated by most land seismic sources and sometimes as converted P-waves, is an elastic body wave in which particles oscillate perpendicular to the direction in which the wave propagates. S-waves, also known as shear waves, travel more slowly than P-waves and cannot travel through fluids because fluids do not support shear. It should be noted that S-waves could be converted to P-waves. Recording of S-waves requires receivers coupled to the solid earth and their interpretation can allow determination of rock properties such as fracture density and orientation, Poisson's ratio, and rock type by cross-plotting P-wave and S-wave velocities and other techniques.

In a further description of terminology, a shotpoint is one of a number of locations or stations at the surface of the earth at which a seismic source is activated. A seismic trace is the seismic data recorded, by one channel, after the seismic source has been fired. The seismic trace represents the response of the elastic wave field to velocity and density contrasts across interfaces of layers of rock or sediments as energy travels from the seismic source through the subsurface to a receiver or receiver array. Further, a seismic inversion is a process of transforming seismic reflection data into a quantitative property description of a strata description of an underground location and possibly a reservoir containing fluids, such as oil or gas, or other natural resources.

Figure 1:
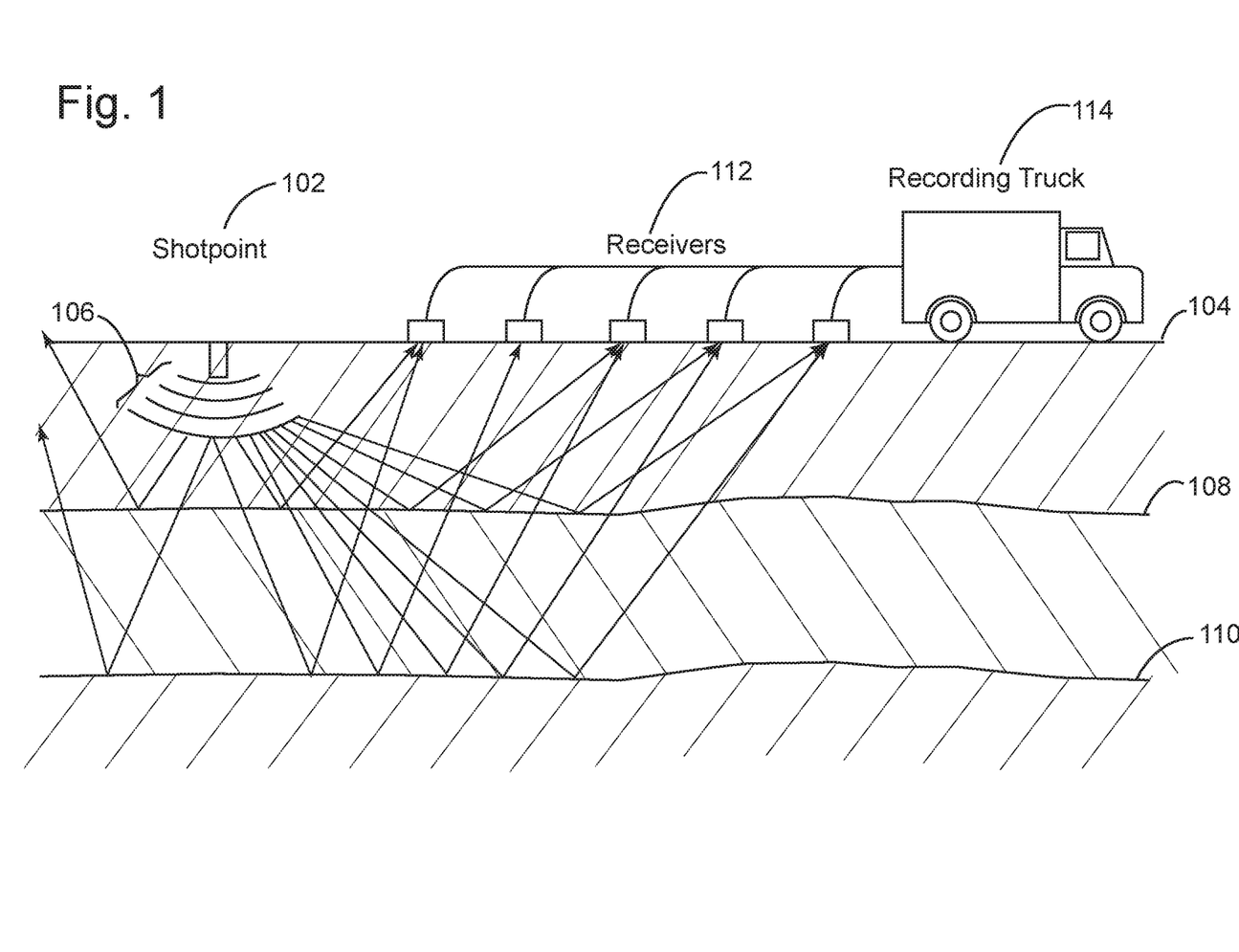
FIG. 1 illustrates an example land-based seismic data acquisition system.

Looking now to FIG. 1, a context diagram illustrates the previously described aspects. A shot is fired at a shot point 102 on the surface 104 of the earth to propagate a series of waves 106 through different layers 108, 110 under the surface 104. The waves are reflected by the interfaces at the different layers 108, 110 at different times after the shot is fired and at different angles. The reflected waves are detected by receivers 112 that are attached to or placed in the earth. One or more of the receivers 112 are configured to be responsive to one or both of P-wave or S-waves. In certain implementations, one or more receivers 112 are tri-axial geophones. In certain implementations, the receivers 112 are configured so that the received seismic data is a narrow-azimuth survey. In other implementations, the receivers 112 are configured so that the received seismic data is a wide-azimuth survey.

A recording device 114 collects the seismic data from the receivers and records the data for future analysis. It should be noted in the exemplary embodiment that computations on the recorded data can occur in the recording device 114 or they can occur in another location after the seismic data has been transferred.

Example embodiments of the present disclosure may employ data from land-based seismic surveying, such as that shown in FIG. 1. In other example embodiments, the system receives data from Ocean Bottom Cable (OBC) and/or Ocean Bottom Node (OBN) surveying. In some example embodiment, these sensors are place under water up to a depth of 2,500 meters. Other example embodiments use sensors for data acquisition at even greater depths.

Figure 2:
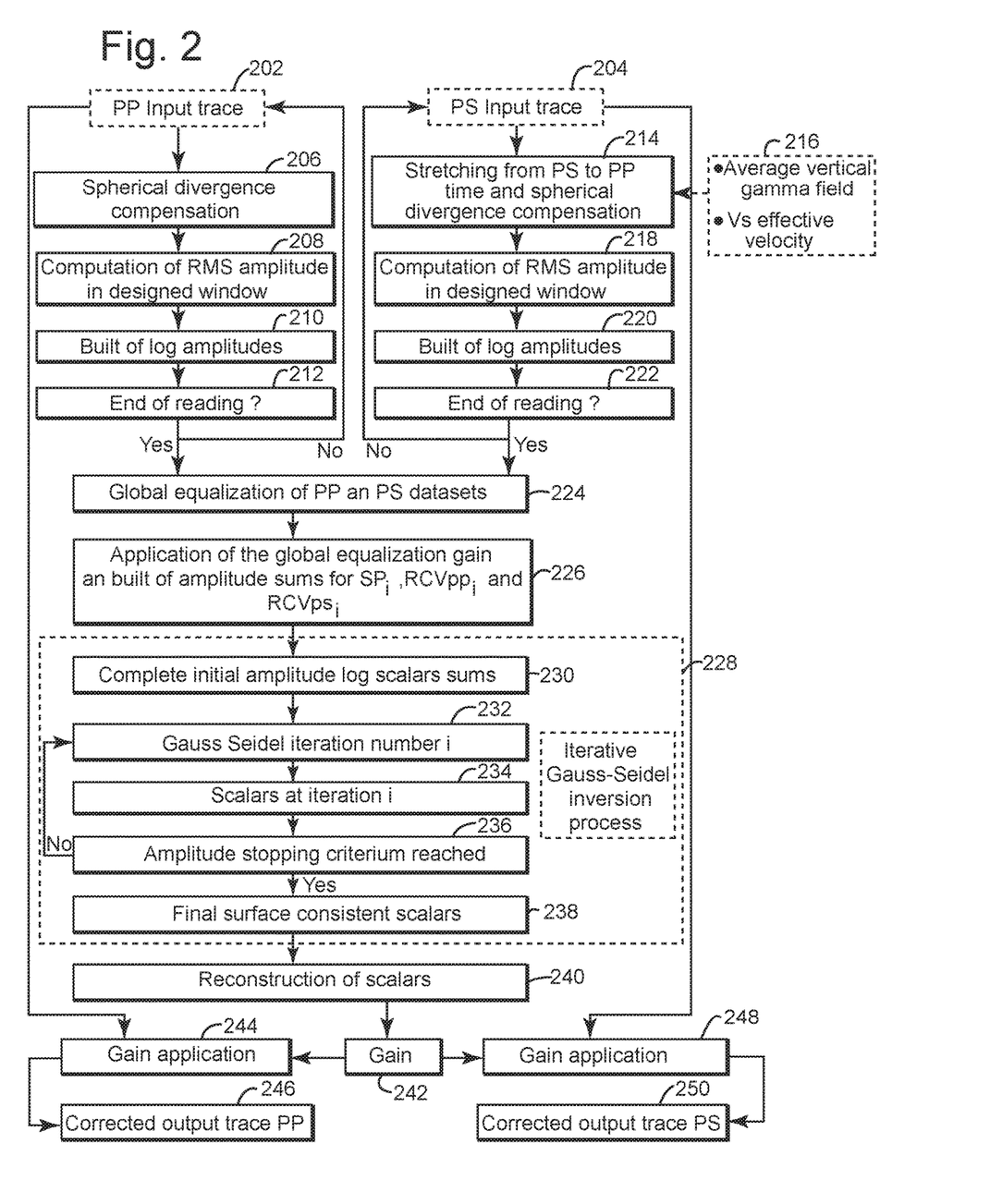
FIG. 2 is a block diagram of an example computer system suitable for implementing one or more embodiments disclosed herein.

FIG. 2 is a flow chart of an example method according to the present disclosure for determining surface-consistent amplitude corrections for amplitude perturbations due to near-surface condition, denoted generally as 200. In certain example implementations, various near surface conditions can be corrected using the present disclosure including, for example, desert surface, such as salt flats (which may be referred to as sabkhas), dunes, foothills, artic terrain, and swamps. In certain implementations, the present disclosure is suitable for any area where the first hundred meters of earth are poorly consolidated.

Example implementations may omit one or more of the blocks shown in in FIG. 2, while other implementations may include additional steps not shown in FIG. 2. Still other implementations may perform one or more of the blocks in FIG. 2 in an alternate order from the order shown in FIG. 2. The example implementation of FIG. 2 receives seismic survey data, including P-P data 202 and P-S data 204. The P-P survey data 202 and P-S survey data 204 are prepared for the joined inversion process 228. The method includes performing spherical divergence compensation on the P-P data 202 (block 206). The spherical divergence compensation 206 is operable to compensate for the decrease in wave strength with distance because of geometric spreading. In block 208, the example embodiment then computes the root mean square (RMS) amplitude of the P-P data in a designated window. In certain example implementations, the time window used for the amplitude computations is determined according to the target area to image. In some implementations, the width of the time window used for amplitude computations is large enough to maintain a high signal-to-noise ratio for the P-P data 202 and the P-S data 204 in the computation window. With respect to the chosen window, the system can determine better solutions if horizons in time domain are available to delimit the window boundary. In other example embodiments, the window start and end times vary with offset between different readings of P-P data 202. In some example embodiments, the system applies a normal move-out (NMO) to the P-P data 202 and P-S data 204 before computing the RMS amplitude of the P-P data 202 and stretched P-S data 204 in the designated window. In block 210, the system determines log amplitudes from the computed RMS amplitudes. The system sums the amplitude component in block 230. In block 212, the system determines if there is further P-P data for analysis and, if so, the system returns to block 202 to receive the further P-P data 202 and repeat blocks 206, 208, and 210 for the further P-P data 202.

A similar preparation process is also performed for the P-S data 204. As discussed above, the system receives P-S data 204. An estimate of the P-S effective velocity and the average vertical gamma field (block 216) is used to perform the P-S to P-P matching of the block 214. In some embodiments, the P-S effective velocity is estimated using velocity scans together with manual or semi-automatic event picking techniques. In example embodiments, the P-S effective velocity is refined iteratively starting from a first guess. At each step, one or more small perturbations of the current velocity field are applied to the P-S effective velocity. In some embodiments, the perturbations are retained if they improved the focusing of the events on stacks. In some embodiments, the average vertical gamma field is estimated using events registration techniques, which try to maximize the similarity of P-P and squeezed P-S stack sections. In block 214, the P-S data 204 is modified to squeeze the P-S data 204 from P-S time to P-P time based, at least in part, on the estimated P-S effective velocity and the average vertical gamma field (from block 216). The squeeze applied to the P-S radial data enables the system to relocate most of the converted wave energy in the same way as the P-P energy (of P-P data 202). In example embodiments, instead of PS data squeezing, the start and end times of the P-S time window are computed from the P-P start and end times using at least average vertical gamma field. In other implementations, the entire P-S data 204 is used by the system, rather than just the radial projection of the P-S data 204. One example implementation used for the P-S data the L2 norm of the P-S horizontal components and estimate a single receiver scalar per receiver station for the two horizontal components. Another example implementation uses two or more different receiver scalars for each of the two P-S data components within a coordinate system. In the latter the traces, the P-P data 202 and the two components of the P-S data 204 originating from the same shot-point share a common shot-point scalar. The processes performed on each of the two P-S components are similar to the processes performed on the P-S radial data 204 to step 226.

Also in block 214, the system performs spherical divergence compensation on the P-S data 204 that has been squeezed to P-P time. In block 218, the system computes the RMS amplitude of the P-S data 204 in the designated window. In some example embodiments, the system applies a normal move-out (NMO) to the time-squeezed P-S data before the system computes the RMS amplitude of the time-stretched P-S data in the designated window. In block 220, the system builds log amplitudes of the time-stretched P-S data from the computed RMS amplitudes and sums the log amplitudes for each component. At block 222, the system determines if there is further P-S data for analysis and, if so, the system returns to block 204 to receive the further P-S data 204 and repeat blocks 214, 218, and 220 for the further P-S data 204.

Once the P-P data 202 and P-S data 204 have been processed by blocks 206, 208, 210, 212 (for P-P data 202) and blocks 214, 218, 220, and 222 (for P-S data 204), the system determines a global equalization gain for the prepared P-P data and prepared P-S data (block 224). In one example embodiment, this global equalization includes determining a global scaling coefficient to apply to the prepared P-P data 202 and prepared P-S data 204 to normalize amplitude levels across the survey. In some implementations, the global scaling coefficient is determined using the average amplitudes of the sets of P-P traces and P-S traces in the computation window. In some implementations, the system excludes outlier amplitudes before determining the global scaling coefficient. To estimate the average amplitude of the two datasets without taking into account outlier amplitudes, the system uses one or more robust estimation techniques. In block 226, the system applies the global equalization gain (calculated in block 224). In one example embodiment, the surface consistent amplitude terms include the shot point terms ($SP_i$), P-P receiver terms ($RCV_{PPi}$), and P-S receiver terms ($RCV_{PSi}$), where a corresponding set of P-P and P-S receiver terms are with the same shot point term. In some example implementations, the shot-points of the two datasets are indexed in the same way while the indexes corresponding to the receiver traces recorded by different components of the same receiver are recorded differently. In other example implementations, other scalars shared by the P-P data 202 and P-S data 204 are incorporated. In one example implementation, an offset term shared by the P-P data 202 and P-S data 204 may be useful to collect effects due to wave attenuation with propagation. In some implementations, one or more azimuthal terms and bin terms are also used to retain other common properties of the P-P and P-S datasets.

After the P-P input data 202 and the P-S input data 204 have been prepared for joined inversion, the prepared data are input to a joined inversion process 228. The joined inversion process 228 of FIG. 2 is an iterative joined inversion process. In certain implementations, a least-square approach is performed to determine the set of linear equations to be solved by the joined inversion process 228. The joined inversion process 228 iteratively uses one or more Gauss-Seidel iterations to determine the solution of the linear system for the prepared P-P input data 202 and prepared P-S input data 204. Other example implementations use other linear system solvers, such as the conjugate gradient method. In some implementations the different equations of the linear system are weighted differently (weighted least squares) to give more influence to one of the two datasets 202 and 204 for the shot-point scalars determination. Other example implementations use other non-linear system solvers. Other example implementations use a regularized form of the system of equations to be solved, for example a least-squares optimization with one or more of L-1 or TV norm regularization. The example joined inversion process (block 228) begins at block 230 with the complete initial values for the amplitude log scalars, as the initial estimate, to the iterative method to solve the surface-consistent set of linear equations. Next, at block 232, a Gauss-Seidel iteration is performed to estimate each amplitude log scalar for each scalar component at block 234. It should be noted that in the exemplary embodiment, the amplitude log scalars share (that is, they are joined by) the preconfigured-amplitude-stopping-convergence criteria (block 236). Next, at block 238 of the exemplary embodiment, once the joined convergence criteria of block 236 are reached, the final surface consistent scalars are generated. In some example implementations, the convergence criteria is computed based on a combination of three error terms: the global error on the common shot-points computed scalars, the global error on the P-S receivers computed scalars, and the global error on the P-P receivers computed scalars.

Following the inversion process 228, the system uses the solved surface-consistent scalars from the inversion to reconstruct the amplitude scalars (block 240). Based on the reconstructed amplitude scalars, the system determines gains to apply to the P-P data 202 and P-S data 204 (block 242). In block 244, the determined gain for the P-P data 202 is applied to the P-P data 202 to produce a corrected P-P output trace 246. Likewise, in block 248, the determined gain for the P-S data 204 is applied to the P-S data 204 produce a corrected P-S output trace 250.

In certain example implementations, one or both of the corrected P-P output trace 246 and corrected P-S output trace 250 are used for one or more drilling operations, workover operations, or enhancement operations. For example, one or both of the corrected P-P output trace 246 and corrected P-S output trace 250 may be used to determine where to initiate a borehole in the earth and may further be used to determine a drillpath. In other example implementations, one or both of the corrected P-P output trace 246 and corrected P-S output trace 250 are used to determine where to initiate a fracture in a subsurface formation.

Figure 3:
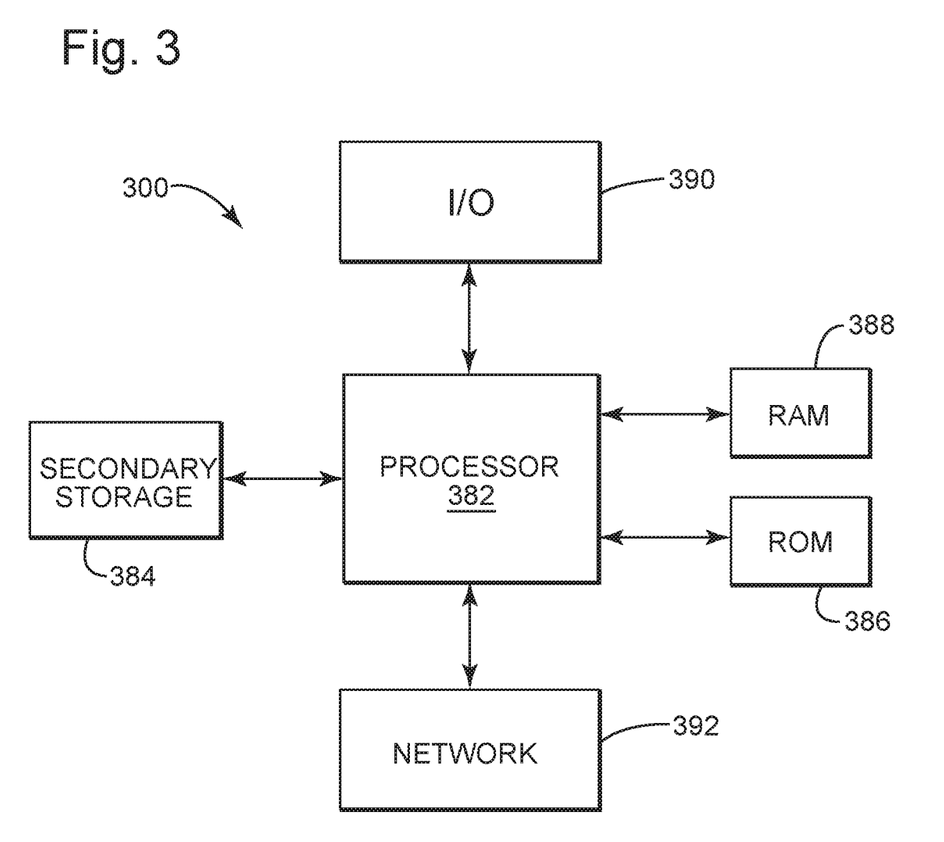
FIG. 3 is a flow chart of an example method of surface-consistent amplitude correction, in accordance with some embodiments of the present disclosure.

FIG. 3 illustrates an example computer system 300 suitable for implementing one or more embodiments disclosed herein. In particular, the computer system 300 may be configured to perform one or more steps show in FIG. 2. The computer system 300 includes a processor 382 (which may be referred to as a central processor unit or CPU) that is in communication with memory devices including secondary storage 384, read only memory (ROM) 386, random access memory (RAM) 388, input/output (I/O) devices 380, and network connectivity devices 382. The processor may be implemented as one or more CPU chips.

It is understood that by programming and/or loading executable instructions onto the computing system 30, at least one of the CPU 382, the RAM 388, and the ROM 386 are changed, transforming the computing system 30 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be implemented in software, because re-spinning a hardware implementation is more expensive than re-spinning a software design. Generally, a design that will be stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs, which are loaded into RAM 388 when such programs are selected for execution. The ROM 386 is used to store instructions and perhaps data, which are read during program execution. ROM 386 is a non-volatile memory device, which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 380 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 382 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 382 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 382 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 382. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In some embodiments, computing system 30 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing system 30 to provide the functionality of a number of servers that is not directly bound to the number of computers in the computing system 30. For example, virtualization software may provide twenty virtual servers on four physical computers. In some embodiments, the functionality disclosed above may be provided by executing the application and/or applications in a cloud-computing environment. Cloud computing may comprise providing computing services via a network connection using dynamically scalable computing resources. Cloud computing may be supported, at least in part, by virtualization software. A cloud-computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In some embodiments, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computing system 30, at least portions of the contents of the computer program product to the secondary storage 384, to the ROM 386, to the RAM 388, and/or to other non-volatile memory and volatile memory of the computing system 30. The processor 382 may process the executable instructions and/or data structures in part by directly accessing the computer program product, for example by reading from a CD-ROM disk inserted into a disk drive peripheral of the computing system 30. Alternatively, the processor 382 may process the executable instructions and/or data structures by remotely accessing the computer program product, for example by downloading the executable instructions and/or data structures from a remote server through the network connectivity devices 382. The computer program product may comprise instructions that promote the loading and/or copying of data, data structures, files, and/or executable instructions to the secondary storage 384, to the ROM 386, to the RAM 388, and/or to other non-volatile memory and volatile memory of the computing system 30.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

The invention claimed is:

1. A method for processing seismic data using joined inversion to determine surface consistent amplitude corrections, the method comprising:
   receiving a seismic data set including P-P data and P-S data associated with common shot point data for a subsurface formation;
   preparing the P-P data and the P-S data for a joined inversion to produce prepared P-P data and prepared P-S data;
   performing the joined inversion on both the prepared P-P data and the prepared P-S data to calculate final surface consistent scalars, the joined inversion using a least square approach starting from values of amplitude log scalars to determine a set of equations to be solved;
   outputting a corrected P-P trace determined from the P-P data, and a P-P gain obtained from the final surface consistent scalars;
   outputting a corrected P-S trace determined from the P-S data and a P-S gain obtained from the final surface consistent scalars; and
   using the corrected P-P trace and/or the corrected P-S trace for guiding one or more of drilling operations, workover operations, or enhancement operations, in the subsurface formation,
   wherein the preparing of the P-P data and P-S data, includes modifying both the P-P data and the P-S data to compensate for spherical divergence, modifying the P-S data to squeeze the P-S data to P-P time, and performing a global amplitude equalization of the P-P data and the P-S data, and the final surface consistent scalars include shot-related scalars, P-P receiver scalars and P-S receiver scalars.

2. The method of claim 1, wherein the preparing of the P-P data and the P-S data for the joined inversion further comprises:
   determining an RMS amplitude of the P-P data in a designated window; and
   determining an RMS amplitude of the P-S data in the designated window.

3. The method of claim 1, wherein the preparing of the P-P and P-S data for the joined inversion also comprises:
   estimating an estimated P-S velocity and an estimated vertical gamma field; and
   the modifying of the P-S data to squeeze the P-S data to P-P time uses the estimated P-S velocity and the estimated vertical gamma field.

4. The method of claim 1, wherein the joined inversion is performed iteratively until an amplitude-stopping-criterium is met.

5. The method of claim 4, wherein the set of equations is a linear set of equations solved using a Gauss-Seidel inversion process.

6. The method of claim 4, wherein the amplitude-stopping-criterium is computed based on one or more of a global error of common shot-points computed scalars, a global error on P-S receivers computed scalars, and a global error on P-P receivers computed scalars.

7. The method of claim 1, further comprising:
   determining a P-P gain to apply to the P-P data to produce a corrected output P-P trace; and
   determining a P-S gain to apply to the P-S data to produce a corrected output P-S trace.

8. The method of claim 1, wherein the seismic data set is a wide-azimuth seismic data set.

9. A system for processing seismic data comprising:
   at least one processor; and
   a memory including non-transitory computer-readable executable instructions, wherein the executable instructions cause the at least one processor to:
      receive a seismic data set including P-P data and P-S data, wherein the P-P data and P-S data are associated with common shot point data for a subsurface formation;
      prepare the P-P data and the P-S data for a joined inversion to produce prepared P-P data and prepared P-S data;
      perform the joined inversion on both the prepared P-P data and the prepared P-S data to calculate final surface consistent scalars, the joined inversion using a least square approach starting from values of amplitude log scalars to determine a set of equations to be solved;
      output a corrected P-P trace determined from the P-P data, and a P-P gain, wherein the P-P gain is obtained from the final surface consistent scalars; and
      output a corrected P-S trace determined using the P-S data and a P-S gain, wherein the P-S gain is obtained from the final surface consistent scalars, wherein
      the corrected P-P trace and/or the corrected P-S trace are used for one or more of drilling operations, workover operations, or enhancement operations, for the subsurface formation,
      the preparing of the P-P data and P-S data, includes modifying both the P-P data, and the P-S data to compensate for spherical divergence, modifying the P-S data to squeeze the P-S data to P-P time, and performing a global amplitude equalization of the P-P data and the P-S data, and the final surface consistent scalars include shot-related scalars, P-P receiver scalars and P-S receiver scalars.

10. The system of claim 9, wherein the executable instructions that cause the at least one processor to prepare the P-P and P-S data for the joined inversion further cause the at least one processor to:

determine an RMS amplitude of the P-P data in a designated window; and determine an RMS amplitude of the P-S data in the designated window.

11. The system of claim 9, wherein the executable instructions that cause the at least one processor to prepare the P-P and P-S data for the joined inversion also cause the at least one processor to:

calculate an estimated P-S velocity and an estimated vertical gamma field; and the modifying of the P-S data to squeeze the P-S data to P-P time uses the estimated P-S velocity and the estimated vertical gamma field.

12. The system of claim 9, wherein the executable instructions that cause the at least one processor to perform the joined inversion iteratively until an amplitude-stopping-criterium is met.

13. The system of claim 12, wherein the set of equations is a linear set of equations solved using a Gauss-Seidel inversion process.

14. The system of claim 12, wherein the amplitude-stopping-criterium is computed based on one or more of a global error of common shot-points computed scalars, a global error on P-S receivers computed scalars, and a global error on P-P receivers computed scalars.

15. The system of claim 9, wherein the executable instructions further cause the at least one processor to:

determine a P-P gain to apply to the P-P data to produce a corrected output P-P trace; and determine a P-S gain to apply to the P-S data to produce a corrected output P-S trace.

16. The system of claim 9, wherein the seismic data set is a wide-azimuth seismic data set.

17. A system for geological surveying comprising:

a plurality of receivers to receive energy emerging from a subsurface formation and produce a seismic data set including P-P data and P-S data corresponding to the received energy;

at least one processor; and a memory including non-transitory computer-readable executable instructions, wherein the executable instructions cause the at least one processor to:

receive the seismic data set;

prepare the P-P data and the P-S data for a joined inversion to produce prepared P-P data and prepared P-S data, by modifying both the P-P data and the P-S data to compensate for spherical divergence, modifying the P-S data to squeeze the P-S data to P-P time, and performing a global amplitude equalization of the P-P data and the P-S data;

perform a joined inversion on both the prepared P-P data and the prepared P-S data to calculate final surface consistent scalars, the joined inversion using a least square approach starting from values of amplitude log scalars to determine a set of equations to be solved;

output a corrected P-P trace determined from the P-P data, and a P-P gain, wherein the P-P gain is obtained from the final surface consistent scalars; and output a corrected P-S trace determined from the P-S data and a P-S gain, wherein the P-S gain is obtained from the final surface consistent scalars, wherein the corrected P-P trace and/or the corrected P-S trace are used for one or more of drilling operations, workover operations, or enhancement operations, for the subsurface formation, the preparing of the P-P data and P-S data, includes modifying both the P-P data, and the P-S data to compensate for spherical divergence, modifying the P-S data to squeeze the P-S data to P-P time, and performing a global amplitude equalization of the P-P data and the P-S data, and the final surface consistent scalars include shot-related scalars, P-P receiver scalars and P-S receiver scalars.

18. The system of claim 17, wherein one or more of the plurality of receivers are tri-axial geophones.

* * * * *